Patented Nov. 15, 1949

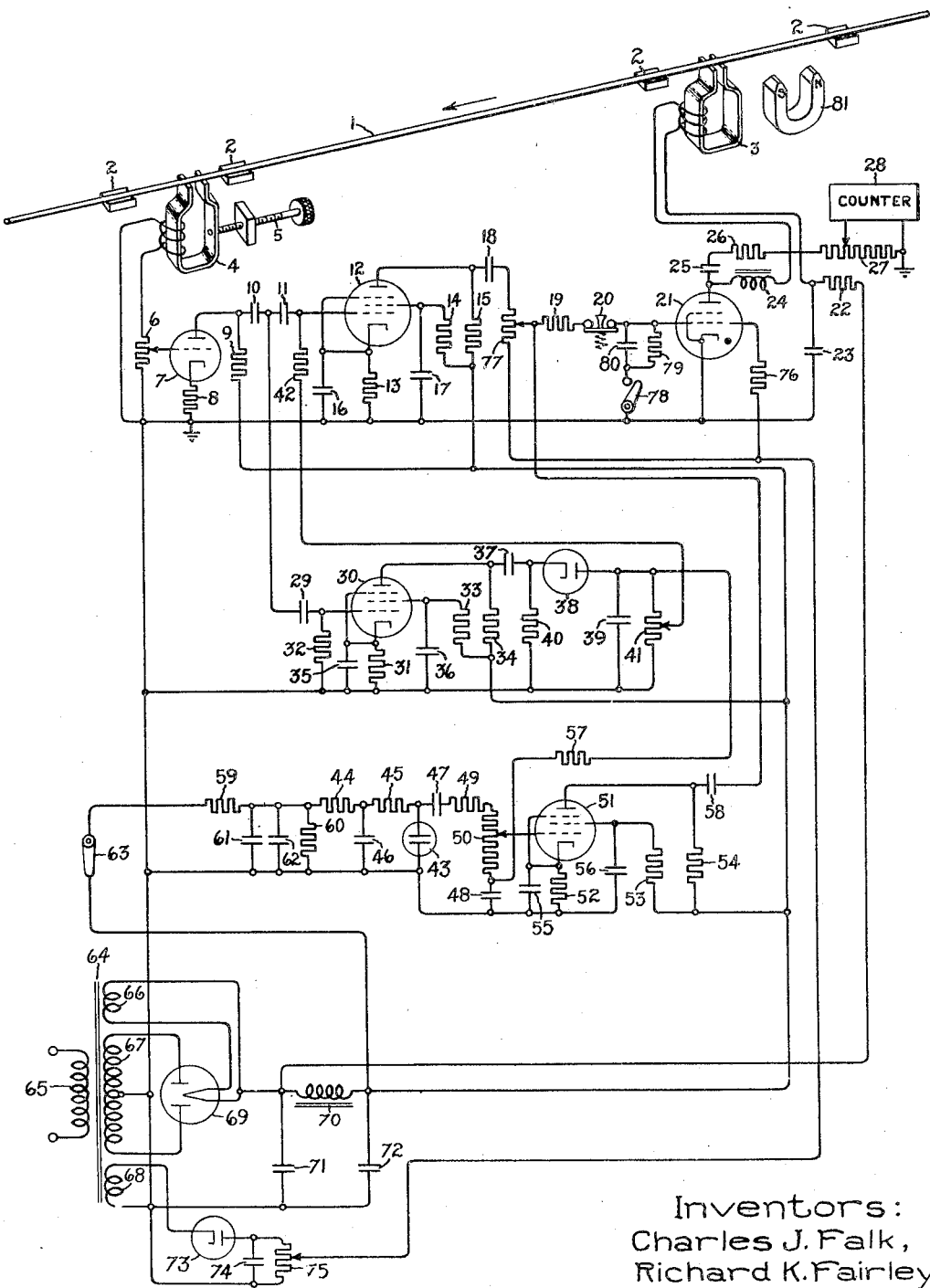

2,488,277

UNITED STATES PATENT OFFICE 2,488,277

MAGNETIC WIRE FOOTAGE METER

Charles J. Falk, Richard K. Fairley, and Thomas T. Short, Schenectady, N. Y., assignors to General Electric Company, a corporation of New York Application June 15, 1948, Serial No. 33,018

7 Claims. (Cl. 175—183)

This invention relates to a footage meter for measuring the length of magnetic material, such as steel wire, while it travels past the meter at varying high speed.

A principal object of the invention is to provide sturdy, economical apparatus for making rapid, accurate, and dependable footage measurements of steel wire, or other magnetic material, under conditions encountered in industrial operations. Other objects and advantages of the invention will become apparent as the description proceeds.

In the manufacture of wire, particularly in rewinding operations, it is desirable to have a meter which can accurately measure wire footage as the wire travels at high, and often varying speed, as from a swift to a reel. If roller-driven measuring instruments are used in high-speed operation, the roller tends to slip relative to the wire, and by non-uniform amounts, thus introducing error into the footage measurement. If very light, low-inertia rollers are used in an attempt to reduce this slipping, the roller is liable to be damaged should the wire break.

A way of making more accurate measurements of wire footage is to place magnetic marks at fixed intervals along the wire, and count the marks. The marking can be done by an electromagnetic marking head positioned adjacent to and in magnetic flux-linking relation with the wire to be measured. The marking head is basically an electromagnet with the measured wire traveling across its poles. When the marking head is energized by a pulse of current, it places a short, magnetic mark upon the wire. An electromagnetic pick-up head, of similar construction, is placed adjacent to and in magnetic flux-linking relation with the wire and spaced a fixed distance from the recording head in the direction in which the wire travels. When a magnetic mark passes adjacent to the pick-up head, it induces therein a voltage pulse. If means are provided whereby this voltage pulse produces a pulse of current to again energize the marking head, it is evident that a series of magnetic marks will be placed along the wire at fixed intervals; and by counting these marks, which can be done conveniently by counting the current pulses energizing the marking head, and then multiplying the number of marks counted by the fixed interval between marks, it is possible to determine accurately the length of wire which has travelled past the meter.

In attempting to create such a meter suitable for everyday industrial operations, several serious obstacles arise—it is not permissible to merely amplify the voltage induced in the pick-up head and use this amplified signal to energize the marking head, for reasons which will now be discussed.

One difficulty is that the amplitude of voltage pulses induced in the pick-up head inherently depends upon the speed with which the wire travels past the head. This is because of the well-known fact that the voltage induced in a coil is proportional to the time-rate-of-change of magnetic flux through the coil. When the wire measured travels past the pick-up head at a high rate of speed, the time-rate-of-change of magnetic flux due to the magnetic mark upon the wire is greater than it is when the wire travels more slowly. Thus the meter must operate satisfactorily with induced voltages in the pick-up head which vary greatly in amplitude.

Furthermore, in addition to voltages induced by magnetic marks deliberately placed upon the wire, there will inevitably be noise voltages induced by lack of uniformity in dimension, permeability, and previous magnetic history in any commercial wire measured. These induced noise voltages also vary in amplitude with the speed of the wire measured. Thus, even though the marks placed upon the wire may induce signal voltages much larger in magnitude than the noise voltages; yet the noise voltages when the wire is travelling at high speed may be much greater than the desired signal voltages when the wire is travelling at lower speed. A successful footage meter must discriminate between the noise voltages and the desired signal voltages throughout the speed range in which the meter operates. It has been found that the method of "cleaning" or erasing previous magnetism from the wire by a demagnetizing coil, similar to the method used in magnetic sound recorders for erasing previously recorded sound, is not in itself a sufficient solution of this problem in the measurement of commercial wire, since ordinary commercial wire is far less homogeneous and uniform than the special, expensive wire used in magnetic sound recording.

A similar obstacle is that of progressive degeneration of the signal. For the footage meter to work satisfactorily, it is essential that each mark placed upon the wire be uniformly sharp and distinct. Each voltage pulse induced in the pick-up head by a magnetic mark will in general be somewhat broader and have a less steep wavefront than the current pulse which energized the marking head to produce that particular magnetic mark. Therefore, if the induced voltage pulses are merely amplified to provide energization for the marking head without some means to regenerate or reshape the pulses, progressive waveform degeneration will occur; and the magnetic marks upon the wire will become more and more broad and less and less distinct, until they become so indistinct that the marking cycle is interrupted.

To be of commercial value, the magnetic footage meter must have automatic starting means. There is always the possibility that the meter may for some reason skip a count; that is, one of the magnetic marks may not induce a sufficient voltage in the pick-up head to energize the marking head for the next cycle. Usually the loss of the single count is not a serious matter and causes a measurement error of a few feet at most, which is a negligible amount of the total footage on a reel: provided, the meter quickly restarts itself by automatically placing another magnetic mark upon the wire, to recommence the counting cycle. If the meter fails to do this, an unknown and appreciable length of wire may travel past the meter without being measured.

It is equally bad if double counting takes place. This occurs if two magnetic marks are simultaneously present on the wire between the marking head and the pick-up head, so that the interval between marks is reduced to one-half its proper value. The resulting operating cycle is analogous to a second harmonic of the normal operating cycle. Double counting can be initiated in the improper starting of the apparatus, or at any time measurement is in progress if a noise voltage should have sufficient amplitude to energize the marking head. Unless double counting is quickly corrected, the meter indication thereafter will be twice as great as the actual footage of wire travelling past the meter. To be commercially practicable, a magnetic footage meter must automatically correct this condition whenever it arises, and immediately return to normal operation.

Although the invention is described in terms of apparatus for measuring steel wire as it travels from a swift to a reel, as in a rewinding machine, it will be appreciated that the principle of the invention is applicable to footage measurements of steel plate and other magnetizable materials.

The features of the invention which are believed to be novel and patentable are pointed out in the claims forming a part of this specification. For a better understanding of the invention, reference is made in the detailed description which follows to the accompanying drawing in which the single figure is a schematic diagram of a preferred embodiment of the invention, useful in measuring steel wire.

Referring now to the drawing, a wire 1, which is to be measured, is illustrated as travelling past the meter in the direction indicated by an arrow. This wire may be travelling at high speed, for example on a rewinding machine. The wire is held in proper position by guide blocks 2 which are preferably made of hard, wear-resisting material. Guide blocks 2 are the only parts of the meter in physical contact with the wire, so that no other parts of the meter are subject to mechanical wear by the wire. Marking head 3 is essentially a small, U-shaped electromagnet having its poles adjacent to and in magnetic flux-linking relation with the wire. Preferably, the core of marking head 3 is made of one or two thin magnet-core laminations bent into the shape shown, with a gap of about $\frac{1}{8}$ inch between the two poles. When this head is energized by a short pulse of current through its winding, magnetic flux passes from one pole to the other through wire 1, thus placing a sharp, well-defined magnetic mark upon the wire. Preferably the head is positioned as shown for longitudinal magnetization of the wire, since a sharper, better-defined mark is thus obtained and it is unnecessary to adjust the gap between poles to accommodate different wire sizes. However, an operable meter can be built using transverse magnetization of the wire.

Pick-up head 4 is similar in construction to marking head 3, but preferably the gap between its poles is a bit wider, about $\frac{1}{4}$ inch being a satisfactory value. As magnetic marks upon the wire arrive adjacent to the poles of pick-up head 4, each induces a voltage pulse in the pick-up head winding. Responsive to each such voltage pulse, the electronic circuit hereinafter described provides a pulse of current through the winding of marking head 3, so that magnetic marks are placed at fixed intervals along the wire as it travels past the meter. Adjustment means such as screw 5 may be provided to slightly adjust the distance between marking head 3 and pick-up head 4, so that the interval betwen marks on the wire can be accurately adjusted to exactly correspond to some convenient unit of measurement, such as 24 inches.

The induced voltage pulses appear across resistor 6 and are applied to the grid of vacuum tube 7. This vacuum tube, its cathode resistor 8, and its plate load resistor 9 constitute a voltage amplifier stage which amplifies the induced voltage pulses and applies them through capacitors 10 and 11 to the grid of a second vacuum tube 12. Vacuum tube 12, preferably a pentode as illustrated, is of the remote cutoff type. Tube 12, its cathode resistor 13, screen resistor 14, plate load resistor 15, and by-pass capacitors 16 and 17 constitute a second voltage amplifier stage having a gain which is variable responsive to the value of a bias voltage applied to its grid as hereinafter explained. The amplified voltage pulses are then applied through capacitor 18, resistor 19 and switch 20 to the grid of a thyratron 21. The thyratron grid is negatively biased as hereinafter explained, so that the tube is non-conductive in the absence of an applied signal. When a positive voltage pulse of sufficient amplitude is applied to its grid, the thyratron fires and becomes conductive. A pulse of current then flows through the marking head and the thyratron, energizes the marking head and places a magnetic mark upon the wire.

In order to reset the thyratron circuit to its non-conductive state, a resistor 22 is provided between the thyratron and its anode voltage supply, and a capacitor 23 is connected in parallel with the thyratron and marking head in series. When the thyratron is non-conductive, capacitor 23 charges up to the anode supply voltage. When the thyratron fires, capacitor 23 discharges through the marking head and the thyratron to provide the desired current pulse. Resistor 22 limits the current drawn from the anode voltage supply and prevents immediate refiring of the thyratron before its grid regains control. Thus, as soon as capacitor 23 has discharged the thyratron is reset to its non-conductive state and cannot again be fired until capacitor 23 has recharged through resistor 22. This circuit arrangement insures that all pulses energizing the marking head are uniform in amplitude and direction, regardless of the amplitude or direction of pulses firing the thyratron.

When the thyratron fires, its impedance becomes small compared to the impedance of marking head 3, so that the circuit becomes essentially a capacitor discharging through an inductance. The resulting current pulse therefore has a waveform which is approximately $\frac{1}{2}$ cycle of a sine wave. Both the amplitude and duration of this pulse can be controlled by a proper choice of values of capacitance and inductance in the circuit. The duration of the pulse in microseconds is approximately equal to $$\pi\sqrt{1000LC}$$

where C is the capacitance of capacitor 23 in microfarads and L is the inductance of the discharge circuit in millihenries. The maximum amplitude of the current pulse in milliamperes is approximately equal to $$\frac{E}{2}\sqrt{\frac{1000C}{L}}$$

where E is the anode supply voltage. To obtain a pulse of desired amplitude and duration, an additional inductance 24 may be added in series with the recording head if needed. In measuring wire traveling at speeds of 400 to 4000 feet per minute, a pulse having a duration of 200 microseconds and an amplitude sufficient to provide at the marking head a maximum magnetizing force of 1000 ampere turns will give good results.

Each time thyratron 21 fires, its anode voltage drops sharply and a voltage pulse, transmitted by capacitor 25 and resistor 26, appears across resistor 27. This voltage pulse actuates an electronic pulse counter 28, or a recorder, control mechanism, or other device responsive to the number of such voltage pulses. The product of the number of pulses thus counted times the distance between successive magnetic marks placed upon the wire is a footage measurement of the length of wire travelling past the meter. If a meter responsive to pulse-repetition-rate is connected across resistor 27, wire velocity can be measured.

A negative bias voltage for the variable gain amplifier, and for other purposes to be described, is provided by an automatic-gain-control circuit as follows: Voltage pulses from the plate of vacuum tube 7 are applied through capacitors 10 and 29 to the grid of vacuum tube 30. The latter tube with its cathode resistor 31, grid leak resistor 32, screen resistor 33, plate load resistor 34, and by-pass capacitors 35 and 36, further amplifies the voltage pulses and applies them through capacitor 37 to a rectifying circuit comprising diode 38, capacitor 39, and resistors 40 and 41. A rectified negative voltage results across resistor 41 which has a value dependent upon the repetition rate of the induced voltage pulses. This is obviously true, because with each voltage pulse a pulse of current flows through diode 38 and resistor 41. If the frequency of the pulses is doubled, the average value of the current will likewise tend to double, which will in turn increase the D.-C. voltage across the resistor. Cacapitor 39 provides a smoothing action by by-passing A.-C. components. It is true, of course, that the voltage across resistor 41 is also somewhat dependent upon amplitude of the induced voltage pulses. This is not objectionable, but rather aids the automatic-gain-control action since an increased number of pulses and increased amplitude of each pulse occur together in normal operation of the meter. The important feature is that the bias voltage varies responsive to the repetition rate of the pulses if double counting is to be most effectively guarded against as hereinafter explained, and variation responsive to pulse amplitude is merely incidental.

A portion of the bias voltage across resistor 41 is applied through resistor 42 to the grid of vacuum tube 12. As the repetition rate of the induced voltage pulses increases, the negative bias upon vacuum tube 12 increases and its gain is thereby decreased. In normal operation of the meter, the repetition rate of the pulses is directly related to the speed of travel of wire 1. The amplitude of the voltage pulses induced in the pick-up head is also related to the speed of travel of wire 1, as has already been explained. As the voltage amplitude increases due to increased speed of the wire, the gain of amplifier 12 is reduced by the automatic-gain-control so that the amplitude of voltage pulses resulting from normal operation which are applied to the grid of thyratron 21 is substantially uniform, regardless of the speed of travel of wire 1. By substantially uniform, it is not meant that every voltage pulse must necessarily have precisely the same amplitude: the meter may work satisfactorily with the largest voltage pulse almost twice as great as the smallest. But as the speed of wire 1 varies over a wide range, the amplitudes of induced voltage pulses in the pick-up head vary by a factor much larger than two; and relative to this extremely wide variation, the amplitudes of the voltage pulses applied to thyratron 21 are substantially uniform.

Since the voltage pulses applied to the grid of thyratron 21 have a reasonably uniform amplitude, the thyratron can be biased to fire and become conductive responsive to these pulses, and not to fire responsive to voltages of substantially smaller amplitude. Thus, almost all noise voltages have no effect upon the thyratron, since their amplitude is considerably less than the amplitude of the desired signal voltages. Furthermore, the possibility of double counting is eliminated. Suppose an extra magnetic mark should appear on the wire, so that there are two magnetic marks between the recording head and the pick-up head, thus initiating the condition for double counting. The pulse repetition rate at the pick-up head would thereby be doubled, but the amplitude of the induced voltages would not be increased since there would be no increase in the speed of travel of the wire. Due to the increase in the repetition rate, however, a larger negative bias would be applied to vacuum tube 12 and would reduce its gain. The amplitude of voltage pulses applied to the thyratron grid would thus be substantially reduced and would not be sufficient to fire the thyratron. Additional magnetic marks would not be placed upon the wire, and the double-counting condition would be corrected automatically. As a further safeguard against double counting, the value of resistor 22 can be made such that the charging rate of capacitor 23 is just rapid enough to fire the thyratron at a repetition rate corresponding to maximum speed of travel of wire 1. Since double counting would require twice this repetition rate, no double counting can occur at wire speeds substantially greater than one-half the maximum speed of travel of the wire. At speeds less than one-half the maximum speed of travel, however, prevention of double counting must depend upon the automatic-gain-control action previously described.

If there are no marks upon the wire, the repetition rate of induced voltage pulses in the pick-up head will be zero, except for noise. The bias applied to vacuum tube 12 will therefore have a minimum negative value and the amplifier will provide maximum gain. Under such conditions, noise voltages usually are great enough to fire thyratron 21 and place the first mark upon the wire; so that the meter is self-starting, and will restart itself whenever there is an interruption or a skip in the counting process. It is desirable, however, not to depend upon the noise; but to provide a positive starting means in the form of a pulse injector. Such a pulse injector preferably comprises a pulse generator stage and a variable gain stage operated in the manner to be described.

Neon glow-discharge tube 43, resistors 44 and 45, and capacitor 46 constitute a relaxation-type pulse generator stage. Capacitor 46 charges through resistor 44 until its voltage is sufficient to fire tube 43. The capacitor is then rapidly discharged through tube 43 and resistor 45, which creates a sawtooth-shaped voltage pulse. When capacitor 46 is discharged, insufficient current flows through tube 43 to maintain ionization within the tube, and tube 43 again becomes non-conductive. Capacitor 46 then begins to recharge through resistor 44, and the cycle is repeated. The pulse generator stage circuit constants may be proportioned to give such a pulse of voltage every one-half second, or at such other time interval as is desired. Voltage pulses so generated are impressed across capacitors 47 and 48 and resistors 49 and 50 in series. Since capacitor 47 is small compared to capacitor 48, the voltage pulses are thereby differentiated; and short, sharp voltage pulses, corresponding in time to the firing of tube 43 are thus impressed upon the grid of remote cut-off vacuum tube 51.

Tube 51, cathode resistor 52, screen resistor 53, plate load resistor 54, and by-pass capacitors 55 and 56 constitute a variable-gain voltage amplifier stage. Negative bias is applied to the grid of tube 51 from the automatic-gain-control circuit through resistor 57. Amplified voltage pulses are transmitted from the variable gain stage to the grid of thyratron 21 through capacitor 58. When there are no magnetic marks upon wire 1, negative bias voltage from the automatic-gain-control circuit has a minimum value, and the gain of tube 51 is at its maximum. Voltage pulses from the pulse generator stage are then amplified to a sufficient value to fire thyrathon 21, to start the counting operation. When magnetic marks are present upon wire 1 and the wire is travelling past pick-up head 4 with sufficient speed to operate the meter, the bias voltage has a greater negative value and the gain of tube 51 is sufficiently reduced that voltage pulses from the pulse injector no longer fire thyratron 21. The pulse injector thus supplies pulses for positive starting of the counting operation whenever such pulses are needed; and on the other hand, does not inject interfering pulses when the meter is operating normally.

Although the footage meter illustrated can operate over a very wide range of high speeds, it can not operate at such low speeds that the voltage pulses induced in winding 4 are of the same magnitude or smaller than noise voltages inherently present. In the rewinding equipment for which the meter illustrated was designed, such extremely slow speeds of wire travel are encountered only immediately after the machine starts and just as it stops. The latter presents no problem since at that time the footage measurement has already been essentially completed. It is desirable, however, that the starting period be taken care of by providing a short, fixed delay period, two seconds for example, before the first mark is placed upon the wire. During this short delay period, a small length of unmeasured wire travels past the meter. However, this length is a constant of the rewinding machine and may be taken into consideration in determining the total wire footage. This fixed starting delay is realized through a delay circuit comprising resistors 59 and 60 and capacitors 61 and 62. Switch 63, which may be actuated by a relay or other means, is closed simultaneously with the starting of the wire rewinding machine to which the footage meter is attached. Capacitors 61 and 62 then begin to charge through resistor 59. Until these capacitors are substantially fully charged, there is not sufficient voltage applied to the pulse generator stage to fire tube 43. A fixed delay of two seconds is thus provided before the first starting pulse is produced by the pulse generator. Switch 63 remains closed and capacitors 61 and 62 remain substantially fully charged throughout the remainder of the counting period.

Necessary operating voltages are provided by a conventional D.-C. power supply comprising a transformer 64 having a primary 65 adapted for connection to any convenient alternating current source, and secondaries 66, 67 and 68, as illustrated. Secondaries 66 and 67 operate a full wave rectifier tube 69 as shown, and the rectified voltage is filtered by choke 70 and capacitors 71 and 72. This provides plate and screen voltages for the vacuum tube amplifier stages, anode voltage for the thyratron, and D.-C. voltage for the pulse generator stage. A half-wave rectifier 73, together with secondary 68, capacitor 74 and resistor 75, provides a negative bias voltage which is applied to the grid of thyratron 21 through resistors 76 and 77. The tube heater filaments, not shown in the drawing, may be energized from a separate transformer or from a fourth winding on transformer 64. It is evident that any suitable source, such as batteries, may be used in place of the voltage supply circuit illustrated.

Switch 78, resistor 79, and capacitor 80 provide a means for applying a magnetic mark upon the wire whenever desired for test or other purposes. When switch 78 is closed, the negative bias on the grid of thyratron 21 is reduced sufficiently to fire the tube. Switch 20 provides a means for interrupting the counting cycle for test purposes. When switch 20 is open, it is evident that no voltage pulses reach the grid of thyratron 21 to fire the tube. These test switches are not essential to the operation of the meter and may be omitted if desired.

The signal-to-noise ratio in the pick-up head is greatly improved by placing a small permanent magnet 81 in magnetic flux-linking relation with the wire and spaced from the marking head in the direction opposite the pick-up head. The north and south poles of the marking head and the north and south poles of magnet 81 are respectively arranged in opposite order relative to the direction of travel of wire 1. That is, as the wire passes magnet 81, it travels from the north pole to the south pole of the magnet and as the wire travels past marking head 3, it travels from its south pole to its north pole. Magnet 81 thus tends to magnetize the wire uniformly in one direction, and marking head 3 impresses at intervals along the wire short pulses having an opposite magnetic polarity. The magnetic marks are thus made sharper and more distinct, with a consequent improvement in the magnitude and sharpness of the voltage pulses which they induce in pick-up head 4. At the same time, magnet 81 tends to reduce the noise voltages by exerting an erasing action upon any magnetism previously existing in the wire.

It is preferable that magnet 81 not be placed too close to the wire, as otherwise vibration of the wire as it travels past the meter will cause a relatively large variation in the air gap between the wire and the magnet, and hence a relatively large variation in the magnetic flux from the magnet passing through the wire. This variation adds noise and therefore is objectionable. This effect is eliminated if magnet 81, which preferably has a distance between its poles of about ½ inch, is placed with its poles about ½ to ⅝ inches below the wire. Vibration of the wire then produces a negligible variation in the air gap, and hence the magnetic flux from the magnet flowing through the wire is substantially uniform. Preferably magnet 81 is made of high coercive force material so that a reasonable strong magnetic field can be obtained at this distance, or magnet 81 may be an electromagnet.

Resistors 6, 27, 41, 50, 75 and 77 are shown as having adjustable taps to provide maximum flexibility of adjustment of the apparatus to meet varying conditions of operation. A smaller number of adjustments will be adequate in most cases. Thus either resistor 6 or resistor 77 may be provided with an adjustable tap to adjust the amplitude of voltages applied to the thyratron; so that pulses resulting from normal operation will fire the thyratron, whereas pulses resulting from double counting and noise voltages will not fire the thyratron. The tap on resistor 41 may be adjusted to vary the bias voltage applied to tube 12 to secure the greatest uniformity of amplitude of amplified pulses resulting from normal operation. The tap of resistor 50 may be adjusted to fix the output of the pulse injector so that the amplitude of pulses from the injector is just sufficient to fire the thyratron when a low value of negative bias is applied to the grid of tube 51.

In the circuit illustrated, the following values of circuit elements have been found to give good results:

| Resistors: | Ohms | Resistors: | Ohms |
|---|---|---|---|
| 6 | 10,000 | 42 | 1,000,000 |
| 8 | 2,200 | 44 | 10,000,000 |
| 9 | 100,000 | 45 | 30,000 |
| 13 | 240 | 49 | 1,000,000 |
| 14 | 300,000 | 50 | 500,000 |
| 15 | 100,000 | 52 | 750 |
| 19 | 250,000 | 53 | 350,000 |
| 22 | 10,000 | 54 | 100,000 |
| 26 | 1,000,000 | 57 | 1,000,000 |
| 27 | 1,000,000 | 59 | 2,000,000 |
| 31 | 750 | 60 | 10,000,000 |
| 32 | 500,000 | 75 | 25,000 |
| 33 | 350,000 | 76 | 5,000,000 |
| 34 | 100,000 | 77 | 500,000 |
| 40 | 500,000 | 79 | 1,000,000 |
| 41 | 1,000,000 | | |

| Capacitors: | Microfarads | Capacitors: | Microfarads |
|---|---|---|---|
| 10 | .001 | 46 | .5 |
| 11 | .001 | 47 | .001 |
| 16 | 50. | 48 | .1 |
| 17 | .1 | 55 | 10. |
| 18 | .01 | 56 | .1 |
| 23 | 1. | 58 | .001 |
| 25 | .001 | 61 | 1. |
| 29 | .001 | 62 | 1. |
| 35 | 50. | 71 | 40. |
| 36 | .1 | 72 | 40. |
| 37 | .01 | 74 | 50. |
| 39 | .5 | 80 | .001 |

| | |
|---|---|
| Inductor 24 | 1 millihenry |
| Marking head 3 winding | 300 turns .1 millihenry |
| Pick-up head 4 winding | 5800 turns |

| Tube: | Type |
|---|---|
| 7 | 6J5 |
| 12 | 6SK7 |
| 21 | 2050 |
| 30 | 6SJ7 |
| 51 | 6SK7 |

| D.-C. supply voltage: | Volts |
|---|---|
| Rectifier side of filter | +400 |
| Load side of filter | +350 |
| Bias supply voltage | −8 |

The entire meter, except the guide blocks and the pole tips of the marking and pick-up heads, can be enclosed in a case for protection against dust, moisture, and breakage.

Having described the principle of this invention and the best mode in which I have contemplated applying that principle, I wish it to be understood that the apparatus described is illustrative only, and that other means can be employed without departing from the true scope of the invention defined by the following claims.

What we claim as new and desire to secure by Letters Patent of the United States, is:

1. A footage meter for measuring the length of magnetic material traveling past the meter comprising an electromagnetic marking head, an electromagnetic pick-up head, both heads being positioned adjacent to and in magnetic flux-linking relation with the material measured and the pick-up head being spaced from the marking head a fixed distance in the direction of travel of such material, so that energization of the marking head impresses a magnetic mark upon the material measured, which mark upon passing adjacent to the pick-up head induces a voltage pulse therein, the amplitude of such voltage pulse being inherently dependent upon the speed of travel of the material measured, a variable-gain voltage amplifier with automatic-gain-control to amplify such induced voltage pulses by an amount dependent upon their repetition rate so that all such amplified voltage pulses resulting from normal operation of the meter have a substantially uniform amplitude, an electron-tube circuit which, responsive to each such amplified voltage pulse resulting from normal operation but not responsive to voltages of substantially smaller amplitude, energizes said marking head with a current pulse uniform in amplitude and duration with all other such current pulses, and means for counting such current pulses.

2. A footage meter for measuring the length of magnetic material traveling past the meter comprising an electromagnetic marking head, an electromagnetic pick-up head, both heads being positioned adjacent to and in magnetic flux-linking relation with the material measured and the pick-up head being spaced from the marking head a fixed distance in the direction of travel of such material so that energization of the marking head impresses a magnetic mark upon the material measured, which mark upon passing adjacent to the pick-up head induces a voltage pulse therein, the amplitude of such voltage pulse being inherently dependent upon the speed of travel of the material measured, an automatic-gain-control circuit to provide a bias voltage dependent in value upon the repetition rate of such voltage pulses, a vacuum tube voltage amplifier to amplify the induced voltage pulses, said amplifier having a gain variable responsive to the value of said bias voltage so that all such amplified voltage pulses resulting from normal operation of the meter have a substantially uniform amplitude, a thyratron circuit biased to become conductive responsive to each such amplified voltage pulse resulting from normal operation but not responsive to voltages of substantially smaller amplitude, connections for energizing said marking head with current flowing through said thyratron circuit when conductive, means to reset said thyratron circuit to its non-conductive state after a fixed interval of such current flow, so that all such current pulses are uniform in amplitude and duration, and means for counting such current pulses.

3. A footage meter for measuring the length of magnetic material traveling past the meter comprising an electromagnetic marking head, an electromagnetic pick-up head, both heads being positioned adjacent to and in magnetic flux linking relation with the material measured and the pick-up head being spaced from the marking head an adjustably fixed distance in the direction of travel of such material, so that energization of the marking head impresses a magnetic mark upon the material measured, which mark upon passing adjacent to the pick-up head induces a voltage pulse therein, the amplitude of such voltage pulse being inherently dependent upon the speed of travel of the material measured, an automatic-gain-control circuit including a vacuum-tube voltage amplifier and a rectifier connected to provide a negative bias voltage dependent in value upon the repetition rate of such voltage pulses, a vacuum tube amplifier connected to amplify the induced voltage pulses, said amplifier including at least one variable-gain stage having a remote-cut-off vacuum tube biased by said bias voltage so that all such amplified voltage pulses resulting from normal operation of the meter have a substantially uniform amplitude, a thyratron circuit biased to become conductive responsive to each such amplified voltage pulse resulting from normal operation but not responsive to voltages of substantially smaller amplitude, connections such that current flowing through said thyratron circuit when conductive also flows through and energizes said marking head, means to reset said thyratron circuit to its non-conductive state after a fixed interval of such current flow including a resistor connected in series between the thyratron and its anode voltage supply and a capacitor effectively connected in parallel with said thyratron and marking head in series, so that all such current pulses are uniform in amplitude and duration, and means for counting such current pulses.

4. A footage meter for measuring the length of magnetic material traveling past the meter comprising an electromagnetic marking head, an electromagnetic pick-up head, both heads being positioned in longitudinal magnetic flux-linking relation with the material measured, the pick-up head being spaced from the marking head a fixed distance in the direction of travel of such material, so that energization of the marking head impresses a magnetic mark upon the material measured, which mark upon passing adjacent to the pick-up head induces a voltage pulse therein, the amplitude of such voltage pulse being inherently dependent upon the speed of travel of the material measured, a variable-gain voltage amplifier with automatic-gain control to amplify such induced voltage pulses by an amount dependent upon their repetition rate so that all such amplified voltage pulses resulting from normal operation of the meter have a substantially uniform amplitude, an electron-tube circuit which, responsive to each such amplified voltage pulse resulting from normal operation but not responsive to voltages of substantially smaller amplitude, energizes said marking head with a unidirectional current pulse uniform in amplitude and duration with all other such current pulses, and means for counting such current pulses.

5. A footage meter for measuring the length of magnetic material traveling past the meter comprising an electromagnetic marking head, an electromagnetic pick-up head, both heads being positioned adjacent to and in magnetic flux-linking relation with the material measured and the pick-up head being spaced from the marking head a fixed distance in the direction of travel of such material, so that energization of the marking head impresses a magnetic mark upon the material measured, which mark upon passing adjacent to the pick-up head induces a voltage pulse therein, the amplitude of such voltage pulse being inherently dependent upon the speed of travel of the material measured, an automatic-gain-control circuit to provide a bias voltage dependent in value upon the repetition rate of such voltage pulses, a vacuum tube voltage amplifier to amplify the induced voltage pulses, said amplifier having a gain variable responsive to the value of said bias voltage so that all such amplified voltage pulses resulting from normal operation of the meter have a substantially-uniform amplitude, a thyratron circuit biased to become conductive responsive to each such amplified voltage pulse resulting from normal operation but not responsive to voltages of substantially smaller amplitude, connections for energizing said marking head with current flowing through said thyratron circuit when conductive, means to reset said thyratron circuit to its non-conductive state after a fixed interval of such current flow, so that all such current pulses are uniform in amplitude and duration, means for counting such current pulses, and a pulse injector circuit connected to inject at the input of said thyratron circuit periodically repeated voltage pulses, said pulse injector including a stage having a gain variable responsive to the value of said bias voltage so that when normally strong induced voltage pulses are not present in the pick-up head the injected pulses have sufficient amplitude to fire the thyratron, and when normally strong induced voltage pulses are present in the pick-up head the injected pulses have insufficient amplitude to fire the thyratron.

6. A footage meter for measuring the length of magnetic material traveling past the meter comprising an electromagnetic marking head, an electromagnetic pick-up head, both heads being positioned in longitudinal magnetic flux-linking relation with the material measured, the pick-up head being spaced from the marking head a fixed distance in the direction of travel of such material, so that energization of the marking head impresses a magnetic mark upon the material measured, which mark upon passing adjacent to the pick-up head induces a voltage pulse therein, the amplitude of such voltage pulse being inherently dependent upon the speed of travel of the material measured, an automatic-gain-control circuit including a vacuum-tube voltage amplifier and a rectifier connected to provide a negative bias voltage dependent in value upon the repetition rate of such voltage pulses, a vacuum-tube amplifier connected to amplify the induced voltage pulses, said amplifier including at least one variable-gain stage having a remote-cut-off vacuum tube biased by said bias voltage so that all such amplified voltage pulses resulting from normal operations of the meter have a substantially uniform amplitude, a thyratron circuit biased to become conductive to unidirectional current responsive to each such amplified voltage pulse resulting from normal operation but not responsive to voltages of substantially smaller amplitude, connections such that current flowing through said thyratron circuit when conductive also flows through and energizes said marking head, means to reset said thyratron circuit to its non-conductive state after a fixed interval of such current flow including a resistor connected in series between the thyratron and its anode voltage supply and a capacitor effectively connected in parallel with said thyratron and marking head in series, so that all such current pulses are uniform in amplitude and duration, means for counting such current pulses, and a pulse injector circuit connected to inject at the input of said thyratron circuit periodically repeated voltage pulses, said pulse injector including a pulse generator stage and at least one variable-gain stage having a remote-cut-off vacuum tube biased by said bias voltage so that when normally strong induced voltage pulses are not present in the pick-up head the injected pulses have sufficient amplitude to fire the thyratron, and when normally strong induced voltage pulses are present in the pick-up head the injected pulses have insufficient amplitude to fire the thyratron.

7. In a footage meter for measuring the length of material traveling past the meter, of the type having marking means and pick-up means spaced a fixed distance apart along the direction of such travel, in which each time the marking means is energized it places a mark upon the material and each time such a mark passes the pick-up means it energizes the marking means, so that successive marks are placed a fixed distance apart along the material, automatic starting means comprising a pulse generator to generate electrical pulses at a predetermined rate, a variable-gain amplifier connected to amplify such pulses, means for utilizing the amplified pulses to energize the marking means, and rectifying means connected to apply a bias voltage to said amplifier whes the pick-up means is normally operatnig to energize the marking means, thereby reducing the gain of the amplifier and preventing energization of the marking means by the starting means during such normal operation.

CHARLES J. FALK.
RICHARD K. FAIRLEY.
THOMAS T. SHORT.

REFERENCES CITED

The following references are of record in the file of this patent:

UNITED STATES PATENTS

| Number | Name | Date |
|---|---|---|
| 2,259,904 | McNamee et al. | Oct. 21, 1941 |
| 2,332,797 | Hume | Oct. 26, 1943 |
| 2,439,446 | Begun | Apr. 13, 1948 |

Certificate of Correction

Patent No. 2,488,277                                      November 15, 1949

CHARLES J. FALK ET AL.

It is hereby certified that errors appear in the printed specification of the above numbered patent requiring correction as follows:

Column 4, line 17, for "betwen" read *between*; column 14, line 19, for "whes" read *when*; lines 19 and 20, for "operatnig" read *operating*;

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*